July 15, 1947.   A. BECHLER   2,424,013
BEARING ADJUSTING DEVICE
Filed May 28, 1945
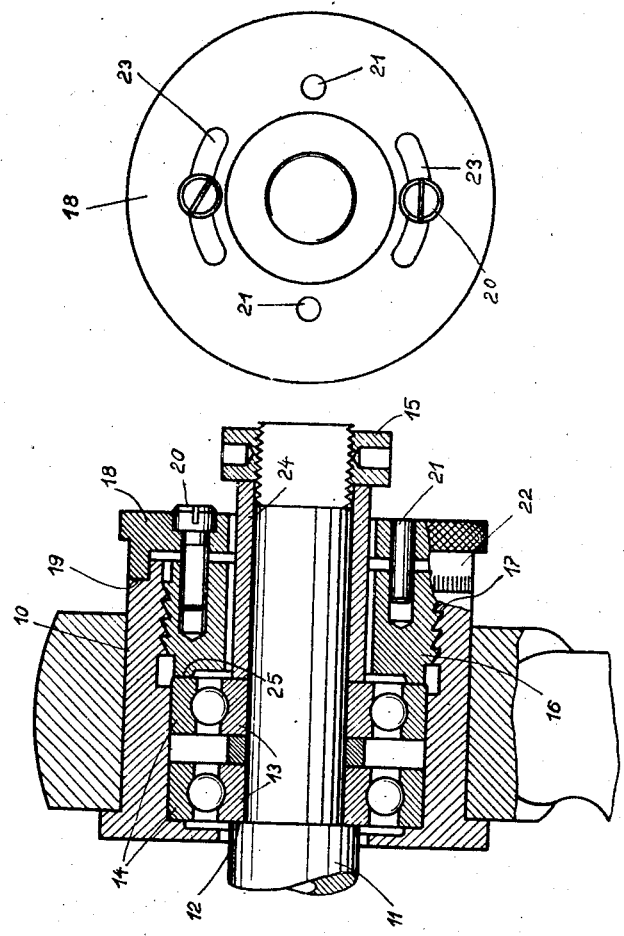
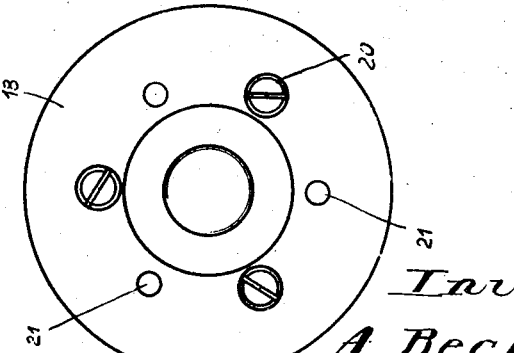

Patented July 15, 1947

2,424,013

UNITED STATES PATENT OFFICE 2,424,013

BEARING ADJUSTING DEVICE

André Bechler, Moutier, Switzerland

Application May 28, 1945, Serial No. 596,335
In Switzerland June 20, 1944

3 Claims. (Cl. 308—189)

This invention relates to a device for play adjustment in a machine bearing.

In machines of high precision the shafts must not have more play in their bearings than is necessary for rotation. For this purpose the axles and shafts are provided with stops cooperating with certain adjustable elements of the bearings by means of which the play is adjusted within the limits prescribed for each machine. These elements are, in general, nuts screwed to the shaft end and held in place by means of jam nuts. This manner of proceding has the great disadvantage that the friction of the jam nut on the nut very often suffices for changing the position of the former and, in consequence, for altering the original adjustment when unlocking.

The device according to the invention remedies these inconveniences in that the nut, which acts axially upon the elements holding the shaft in place, is rotatable by a ring abutting on the bearing body, locking means being provided for fixing the relative position of the said ring and said nut.

The annexed description and drawing represent, by way of examples, two embodiments of the object of invention.

Fig. 1 is an axial section of the first example,

Fig. 2 is a front view thereof, and

Fig. 3 is a front view of the second example.

In Figs. 1 and 2 the shaft 11 is supported on the bearing body 10 by means of two ball-bearings. The inner race-rings 13 of these latter abut against a shoulder 12 of the shaft 11. They are pressed against the said shoulder by means of a sleeve 24 acted upon by a nut 15. The outer race rings 14 are inserted with sliding seat into the bearing body 10, where they are held by a nut 16 screwed into the bearing body by means of a trapezoidal thread having faces perpendicular to the axis of shaft 11.

A ring 18 is mounted on a shoulder 19 of the bearing body and, by means of screws 20, connected with the nut 16. Besides this, nut 16 and ring 18 are connected with each other by means of pins 21 fixed to the ring.

On releasing the screws 20 slightly, the nut 16 can be acted upon by means of the ring 18 to press more or less upon the outer race ring 14 by means of a rim 25 in order to give the ball bearing more or less play. This operation is facilitated in that the ring 18 carries a graduation 22 which rotates along a non-illustrated mark allowing of the path run through by the nut 16 being determined. This done, the nut 16 can be locked by tightening the screws 20 whereby the faces of the thread of the nut, which are perpendicular to the shaft 11 bear against the corresponding parts of the bearing body 10. In this way, the position of the nut 16 can be adjusted with great precision and without the unlocking of this nut resulting in a change in the position which is occupied at the beginning of the play adjustment.

The embodiment shown in Fig. 3 differs from the first one by cut-outs 23 in the ring 18 only in which the shanks of the screws 20 can take different positions. The nut 16 on rotation of the ring 18, is thus taken along solely by the pins 21 which can be adjusted with high precision.

What I claim is:

1. In a machine, a shaft, a housing with a thread, a ball-bearing comprising an inner race member rigidly connected with said shaft, and an outer race member inserted with sliding seat in said housing, a rotatable ring abutting on said housing, a nut engaging the thread of said housing and adapted to be rotated by said ring and to act axially upon said outer race member to adjust the radial play of said ball-bearing, and adjustable tightening means connecting said nut and said ring, adapted to connect, in tightened condition, said nut and said ring rigidly with said housing.

2. In a machine according to claim 1, pins connecting said ring and said nut, said tightening means being formed as locking screws.

3. In a machine according to claim 1, said nut having a trapezoidal thread, the thread face perpendicular to the axis of said nut being turned away from said ball-bearing.

ANDRÉ BECHLER.

REFERENCES CITED

The following references are of record in the file of this patent:

UNITED STATES PATENTS

| Number | Name | Date |
|---|---|---|
| 1,778,258 | Jennings | Oct. 14, 1930 |
| 1,923,777 | Delaval-Crow | Aug. 22, 1933 |
| 1,924,282 | Jenny | Aug. 29, 1933 |
| 517,235 | Pettit | Mar. 27, 1894 |
| 1,693,538 | Allen | Nov. 27, 1928 |